Dec. 23, 1969    E. R. CARLSON    3,486,116
LIQUID-MICROWAVE LEVELING INDICATOR
Filed Oct. 5, 1966    2 Sheets-Sheet 1

INVENTOR.
ERNEST R. CARLSON
BY Harry A. Herbert Jr.
and Sherman H. Goldman
ATTORNEYS Dec. 23, 1969  E. R. CARLSON  3,486,116
LIQUID-MICROWAVE LEVELING INDICATOR
Filed Oct. 5, 1966  2 Sheets-Sheet 2

INVENTOR.
ERNEST R. CARLSON
BY Harry A. Herbert Jr.
and
Sherman H. Goldman
ATTORNEYS United States Patent Office  3,486,116
Patented Dec. 23, 1969

3,486,116
LIQUID-MICROWAVE LEVELING INDICATOR
Ernest R. Carlson, Clay, N.Y., assignor to the United
States of America as represented by the Secretary of
the Air Force
Filed Oct. 5, 1966, Ser. No. 584,610
Int. Cl. G01r 27/04
U.S. Cl. 324—58.5                                    4 Claims

ABSTRACT OF THE DISCLOSURE

A leveling indicator including a section of wave guide having RF windows and connected to an electronic system with a liquid either conductive or dielectric located between the windows; the change in depth of the liquid as the wave guide is tilted causes a phase shift which is detected and indicates that the wave guide is tipped.

---

This invention relates generally to leveling indicators or devices for determining the deviation from the horizontal of apparatus and more particularly to electronic means for such determination.

Previously, spirit levels were used by carpenters and millwrights for this type of measurement and required the presence of the observer at the site of the apparatus to read the bubble. With this invention the reading may be taken at any distance from the apparatus thereby providing for great convenience in leveling large equipment such as a radar antenna, for example.

Briefly, this invention comprises a length of microwave wave guide attached to the surface of the apparatus to be leveled in such a manner that the dimension which determines the wavelength of the guide is normal to the surface, and the propagation axis is parallel to the surface. A portion of the wave guide is sealed off with RF windows and an appropriate amount of fluid having high dielectric constant or high conductivity is introduced partly to fill the portion of the wave guide so sealed off. An RF current is then introduced in the wave guide, and deviation of the axis of the guide from the horizontal will cause the distance from the surface of the liquid and the top of the wave guide, and consequently the wavelength of the guide, to vary along its length. By measuring electrical phase of microwave energy sampled at appropriate points along the wave guide, a continuous indication can be obtained of the degree of level or deviation from the horizontal of the guide and the surface to which it is attached by reason of the pull of gravity on the liquid.

Accordingly, it is an object of this invention to provide an electrical indication of the state of level of a piece of apparatus.

It is another object of this invention to provide a continuous indication of a degree of level which can be read at a position remote from the apparatus.

It is still another object of this invention to provide measuring apparatus for determining level by utilizing a wave guide containing a liquid dielectric or conductor to which microwave energy is fed and means for measuring the phase along said wave guide.

It is a further object of this invention to provide a level indicator which can be easily and economically manufactured from conventional, currently available parts and materials that lend themselves to mass production manufacturing techniques.

Further objects and uses of this invention will be apparent upon reading the following description taken in conjunction with the attached drawings, in which.

Figure 1:
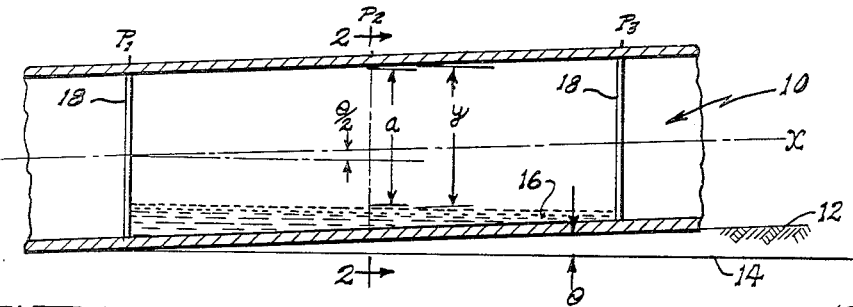
FIGURE 1 is a view of a longitudinal cross section of a length of microwave guide showing RF windows and a fluid contained therein for illustrating the principles of this invention.
Figure 2:
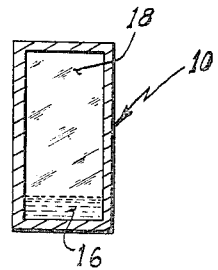
FIGURE 2 is a cross section of FIGURE 1 taken at 2—2.
Figure 5:
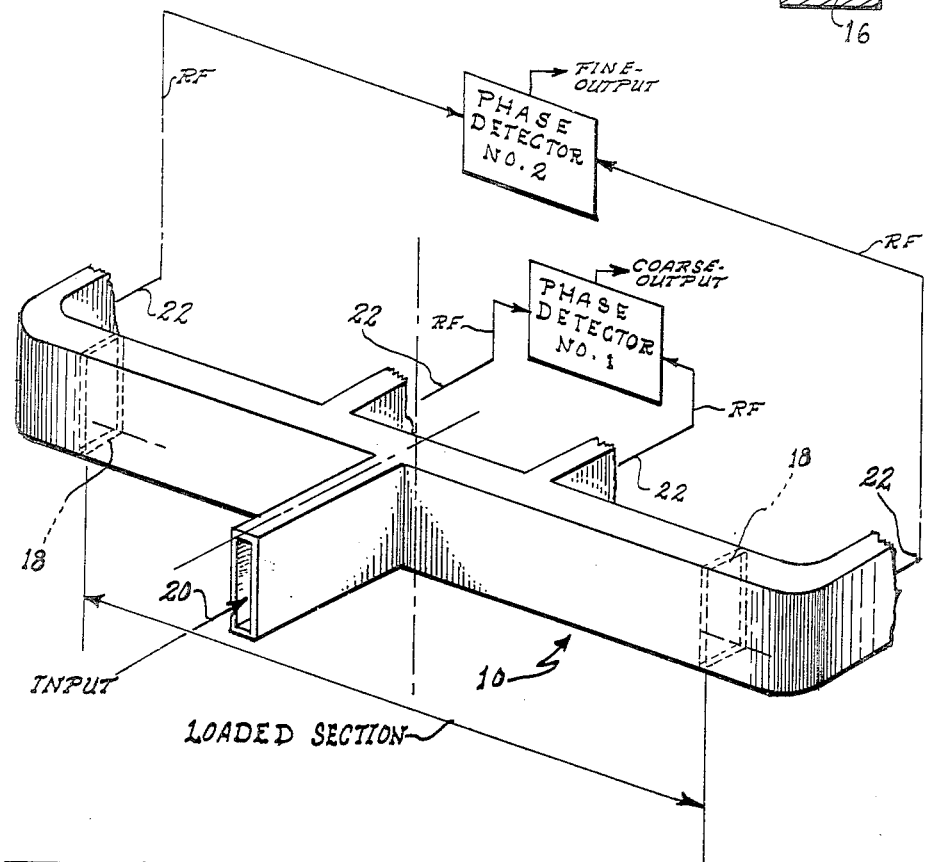
FIGURE 5 is an isometric view, partly in section, of another embodiment illustrating the RF input at the center of the wave guide and RF outputs at selected points along its length.
Figure 3:
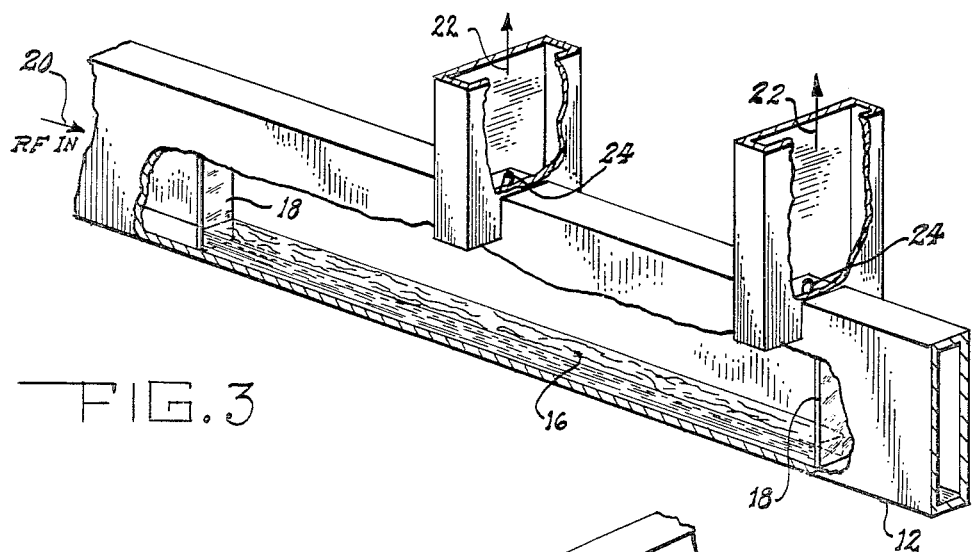
FIGURE 3 is an isometric view of one embodiment of the invention having an RF input at an end portion and RF outputs at selected points along the guide.
Figure 4:
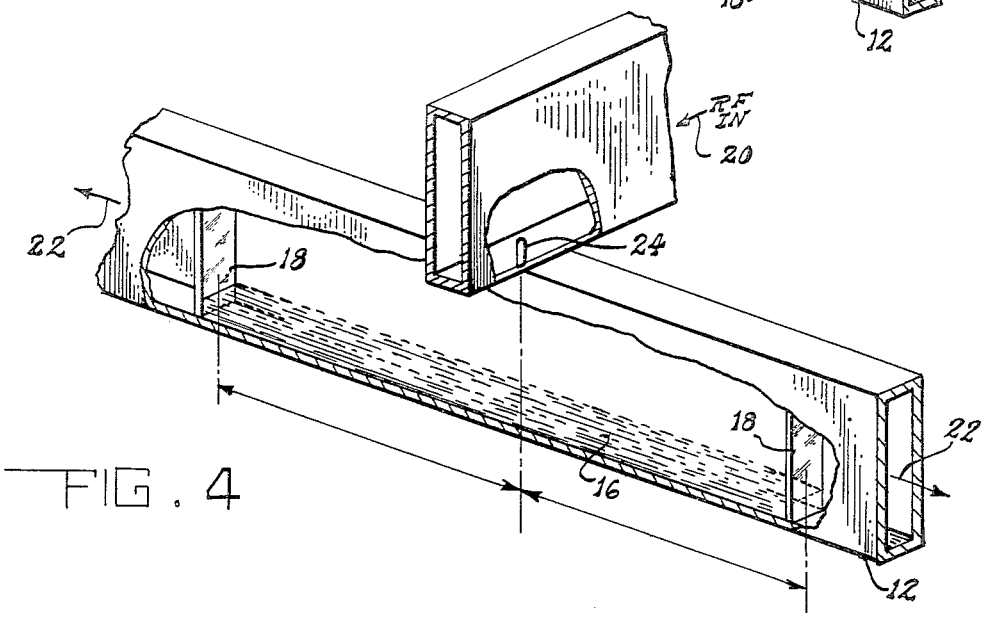
FIGURE 4 is an isometric view, partly in section, of another embodiment having the RF input at the top center of the guide and RF outputs at the ends thereof.

The principle upon which this invention rests is best illustrated in FIGURE 1 where a section of microwave guide 10 is placed on a surface 12 to be tested. A quantity of fluid 16 is introduced in the wave guide and is contained between RF windows 18 which, together with the walls of the wave guide 10, define a chamber. If the surface 12 is raised above the horizontal 14 reference level, the liquid in the wave guide will flow toward the opposite end thereof causing a change in the dimension from the top of the guide to the surface of the liquid 16 and thus vary the wavelength of the guide along its length. An RF current is then introduced in the guide 10 at 20 as shown in FIGURES 3, 4, and 5, and the RF outputs at 22 are connected to be measured at various selected points along the length of the guide. Where required, conventional sealed coupling slots are provided. FIGURE 3 is an example of indicators in the main line while FIGURE 4 illustrates the indicator and charge to the main line.

If all measurements are equal, the surface 12 is horizontal to 14. If they differ, the variation from horizontal can be worked out by a formula or by calibration of the assembly.

Within the section of wave guide between planes at $P_1$ and $P_3$, the guide wavelength is modified by the fluid to an extent determined by the character and depth of the fluid. For any angle $\theta$ other than zero (wave guide exactly horizontal) the effective guide wavelength will vary along the wave guide. For example, the phase shift undergone by a microwave travelling between planes $P_1$ and $P_2$ will be different than that undergone by the same wave between planes $P_2$ and $P_3$, and the difference will be a function of the angle $\theta$.

Hence, by exciting a wave which propagates in the wave guide and measuring difference in electrical phase shift over different sections, a voltage can be developed by a suitable phase detector which is a function of $\theta$, the angle between the guide axis and the horizontal.

For simplicity the $TE_{10}$ mode in rectangular guide is considered along with use of a perfectly-conducting fluid.

The effective guide width in the section containing the fluid is then the distance between the fluid surface and the top wave guide wall.

$\theta$ equals angle between guide and horizontal.
X equals distance along propagation axis.
y equals effective guide height.
$\alpha$ equals effective guide height at center of the section containing the fluid. ($\alpha$ is constant for all values of $\theta$ at which the fluid surface touches both windows.)
$\lambda$ equals free-space wavelength.
$\lambda_c$ equals cutoff wavelength.
$\lambda_g$ equals guide wavelength.

Consider the element $x$, an increment along the $x$ axis. For this element, $$\frac{\lambda_c}{\lambda} = \frac{2y}{\lambda} = 2\left(\frac{a}{\lambda} + 2\frac{x}{\lambda}\tan\frac{\theta}{2}\right)$$

For small $\theta$ of the order of 200 milliradians or less, $\tan\theta \cong \theta$, and (1$\alpha$) becomes, $$\frac{\lambda_c}{\lambda} = 2\left(\frac{\alpha}{\lambda} + \frac{x}{\lambda}\theta\right)$$

Guide wavelenth is given by $$\frac{\lambda_g}{\lambda} = \frac{\frac{\lambda_c}{\lambda}}{\sqrt{\left(\frac{\lambda_c}{\lambda}\right)^2 - 1}} = \frac{\left(\frac{a}{\lambda} + \frac{x}{\lambda}\theta\right)}{\sqrt{\left(\frac{a}{\lambda} + \frac{x}{\lambda}\theta\right)^2 \left(\frac{1}{2}\right)^2}}$$

The incremental phase shift $d\phi$ across element $dx$ is given by $$d\phi = \frac{2\pi dx}{\lambda} = \frac{2\pi}{\theta}\left[\frac{\sqrt{\left(\frac{\alpha}{\lambda}+\frac{x}{\lambda}\theta\right)^2 - \left(\frac{1}{2}\right)^2}}{\left(\frac{a}{\lambda}+\frac{x}{\lambda}\theta\right)}\right]\frac{\theta dx}{\lambda}$$

Phase shift from $x=o$ to $x=l$ is given by $$\phi_1 - \phi_0 = \frac{2\pi}{\theta}\int_{x=0}^{1}\frac{\sqrt{\left(\frac{a}{\lambda}+\frac{x}{\lambda}\theta\right)^2 - \left(\frac{1}{2}\right)^2}}{\left(\frac{a}{\lambda}+\frac{x}{\lambda}\theta\right)}\left(\frac{\theta dx}{\lambda}\right)$$

$$= \frac{2\pi}{\theta}\left|\sqrt{\left(\frac{a}{\lambda}+\frac{x}{\lambda}\theta\right)^2 - \left(\frac{1}{2}\right)^2} - \frac{1}{2}\cos^{-1}\frac{1}{2\left(\frac{a}{\lambda}+\frac{x}{\lambda}\theta\right)}\right|_{x=0}^{1}$$

$$= \frac{2\pi}{\theta}\left(\frac{a}{\lambda}+\frac{x}{\lambda}\theta\right)\sqrt{1-\left[\frac{1}{2\frac{a}{\lambda}+\frac{x}{\lambda}\theta}\right]^2}$$

$$-\frac{1}{2}\cos^{-1}\frac{1}{2\left(\frac{a}{\lambda}+\frac{x}{\lambda}\theta\right)}\Big|_0^1 \quad (3\alpha)$$

Inserting limits, $$\phi_1 - \phi_0 = \frac{2\pi l}{\lambda}\sqrt{1-\left[\frac{1}{2\left(\frac{a}{\lambda}+\frac{x}{\lambda}\theta\right)}\right]^2}$$

$$+\frac{2\pi\alpha}{\theta\lambda}\left\{\sqrt{1-\left[\frac{1}{2\left(\frac{a}{\lambda}+\frac{l}{\lambda}\theta\right)}\right]^2} - \sqrt{1-\left[\frac{1}{2\frac{\alpha}{\lambda}}\right]^2}\right\}$$

$$-\frac{\pi}{\theta}\left[\cos^{-1}\frac{1}{2\left(\frac{\alpha}{\lambda}+\frac{l}{\lambda}\theta\right)} - \cos^{-1}\frac{1}{2\frac{\alpha}{\lambda}}\right]$$

This last formula can be applied directly to the simple configuration of FIGURE 3. There are certain advantages, particularly increased sensitivity for a given fluid chamber length, in use of a configuration based upon FIGURE 4.

The equations above can be applied to this latter configuration in two steps. For this case, in applying limits to the last equation, a convention is adopted to the effect that integration in the direction of propagation results in a phase lag which is assumed to be positive. Thus for FIGURE 4 we integrate from $-l$ to zero, giving a phase lead (negative) because direction of propagation is opposite to the integration, and this is added algebraically to the phase lag (positive) resulting from integrating from $o$ to $+l$ in the same direction as the propagation. This algebraic sum is the net phase difference between transverse planes at $(-l)$ and $(+l)$.

The equations for the configuration of FIGURE 4 is thus found to be, for $(\theta_1 - \theta_{-1})$ in electrical degrees:

$$\phi_1 - \phi_{-1} = 360\left[\frac{l}{\lambda} + \frac{a}{\lambda\theta}\right]\sqrt{1-A^2} - \sqrt{1-B^1}$$

$$-\frac{180}{\theta}[\cos^{-1}A - \cos^{-1}B]$$

where $$A = \frac{1}{2\left(\frac{\alpha}{\lambda}+\frac{l}{\lambda}\theta\right)}$$

and $$B = \frac{1}{2\left(\frac{\alpha}{\lambda}-\frac{l}{\lambda}\theta\right)}$$

Extreme sensitivity is possible since the sensitivity is controlled by the geometry. It is evident that decreasing dimension $\alpha$ or increasing dimension $l$ will increase the sensitivity.

When operating with high sensitivity, the dynamic range is restricted because the phase differences involved exceed the capability of typical phase detectors. FIGURE 5 is an example of a configuration which combines a relatively coarse indication having large dynamic range with a fine indication providing maximum sensitivity near the horizontal. This longer loaded section of FIGURE 5 that is the section of the guide containing the liquid, provides the increased sensitvty of the apparatus. The coarse output is taken from two outputs 22 near the center of the guide and two fine outputs are taken from the ends thereof. The coarse output is fed into phase detecor No. 1 and the fine output into phase detector No. 2.

While all the embodiments of this invention shown in the drawings have used a rectangular wave guide, it is not necessary to confine it to this shape since any other shape could be employed. Furthermore, the concept of this invention could be extended from a phase comparison method of detection to an amplitude method of comparison by making use of the change in attenuation of the wave guide as the effective cutoff wavelength is varied.

Among some of the ways this device can be used are the generation of signals to correct a computer in a radar system from deviation of true level. Also, such a device affixed to the stationary element of an elevation data pickoff could be servo-ed to assure a constant elevation reference.

Although the invention has been described with reference to particular embodiments, it will be understood to those skilled in the are that the invention is capable of a variety of alternative embodiments within the spirit and scope of the appended claims.

I claim:
1. An electronic level indicator comprising:
   a length of microwave wave guide;
   a pair of spaced RF windows in said wave guide defining a compartment;
   a fixed quantity of liquid partly filling said compartment;

an RF input connected with said wave guide;
means for sampling energy at various points along said wave guide; and
means connected with said means for sampling energy for indicating changes in phase in said compartment due to variations in level of said liquid at said sampling points with respect to the top of said wave guide in response to the pull of gravity.

2. An indicator as defined in claim 1 wherein said liquid is electrically conductive.

3. An indicator as defined in claim 1 wherein said liquid is dielectric.

4. An indicator as defined in claim 1 wherein said last-mentioned means includes phase detectors for comparing the phase at preselected points along said wave guide.

References Cited

UNITED STATES PATENTS 2,491,418   12/1949   Schlesman _____ 324—58.5
3,235,768   2/1966   Magnuski.

ARCHIE R. BORCHELT, Primary Examiner

P. F. WILLE, Assistant Examiner